United States Patent [19]

Chu et al.

[11] Patent Number: 5,140,949
[45] Date of Patent: Aug. 25, 1992

[54] ZEOLITE-CLAY COMPOSITION AND USES THEREOF

[75] Inventors: Pochen Chu, Voorhees; William E. Garwood, Haddonfield, both of N.J.

[73] Assignee: Mobil Oil Corporation, Fairfax, Va.

[21] Appl. No.: 758,668

[22] Filed: Sep. 12, 1991

Related U.S. Application Data

[62] Division of Ser. No. 409,372, Sep. 19, 1989, Pat. No. 5,079,201.

[51] Int. Cl.$^5$ ................. A23K 1/175; A61K 33/06
[52] U.S. Cl. ............................. 119/174; 426/2; 424/442; 424/684
[58] Field of Search ............... 426/2; 424/64, 69, 442, 424/684; 119/174; 502/68

[56] References Cited

U.S. PATENT DOCUMENTS

| | | | |
|---|---|---|---|
| 2,523,316 | 9/1950 | McClenahan et al. | 424/684 X |
| 3,658,459 | 4/1972 | Gartlan | 8/142 |
| 3,687,680 | 8/1972 | Krchnavi et al. | 424/684 X |
| 4,379,143 | 4/1983 | Sherry et al. | 424/684 |
| 4,416,765 | 11/1983 | Chester et al. | 208/120 |
| 4,704,989 | 11/1987 | Rosenfeld | 119/1 |
| 4,872,421 | 10/1989 | Laurent et al. | 119/1 |
| 4,965,233 | 10/1990 | Speronello | 502/68 X |

FOREIGN PATENT DOCUMENTS

| | | |
|---|---|---|
| 150551 | 9/1981 | Fed. Rep. of Germany . |
| 105786 | 10/1974 | Japan . |
| 20437 | 2/1978 | Japan .................... 424/684 |
| 210104 | 11/1968 | U.S.S.R. . |

OTHER PUBLICATIONS

Davis, C. W. and H. C. Vacher, "Bentonite: Its Properties, Mining, Preparation, and Utilization," Technical Paper 609, USGPO (1940).
Chemical Abstracts 48182f, 48183g, 48184h and 48185j.

*Primary Examiner*—Robert P. Swiatek
*Attorney, Agent, or Firm*—Alexander J. McKillop; Charles J. Speciale; Lori F. Cuomo

[57] ABSTRACT

A hydrous aluminosilicate adsorbent composition in which the active adsorbent is a mixture of non-fibrous clay with non-fibrous zeolite. The composition is useful as a feed supplement in animal husbandry, and as a topical adsorbent for veterinary use. The mixture has a high capacity for adsorption of ammonium cations, and a synergistically high selectivity for their adsorption. Beneficial effects as feed supplement may arise from lowering the amount of ammonia passed to the liver from the alimentary canal.

20 Claims, 2 Drawing Sheets

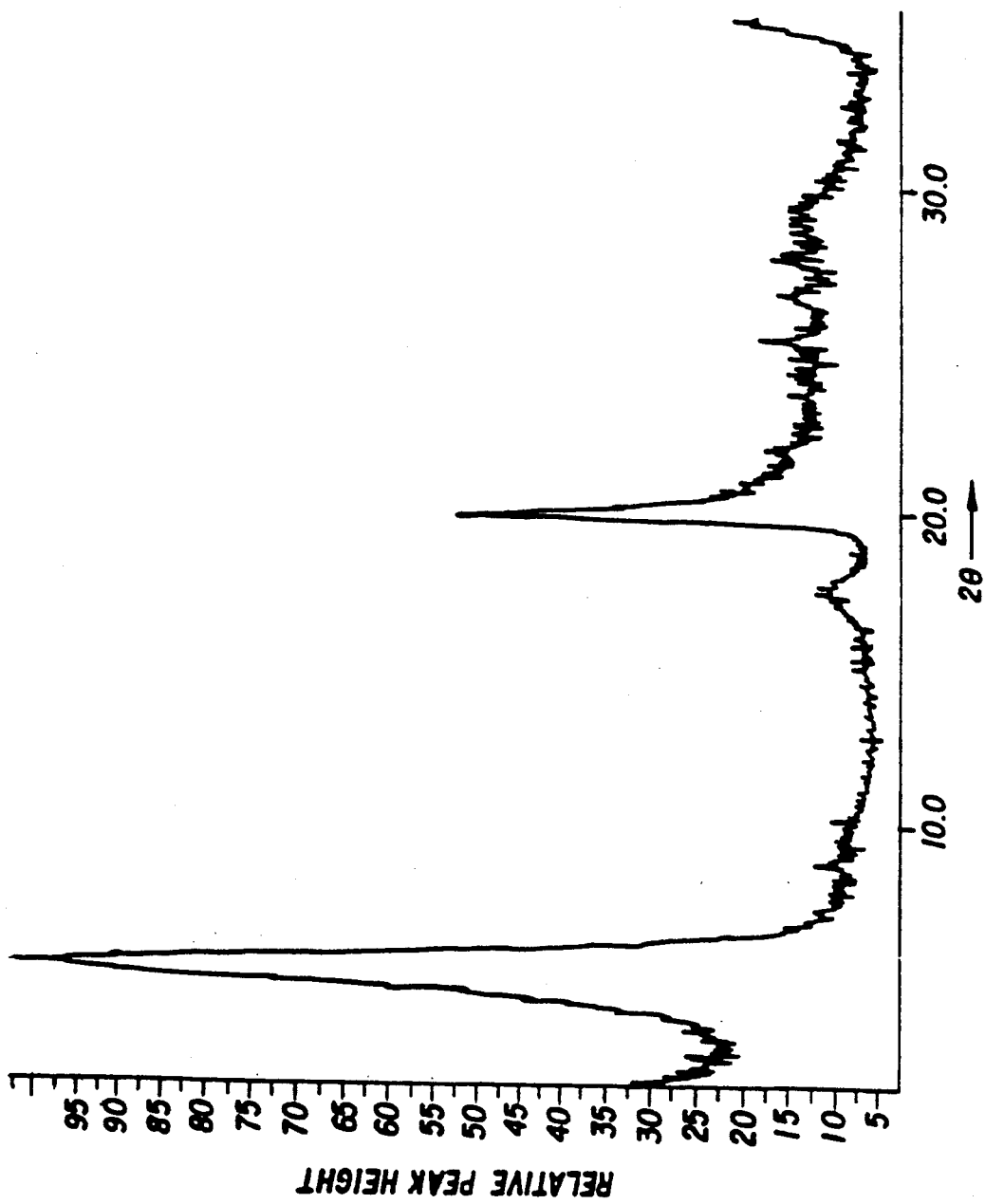

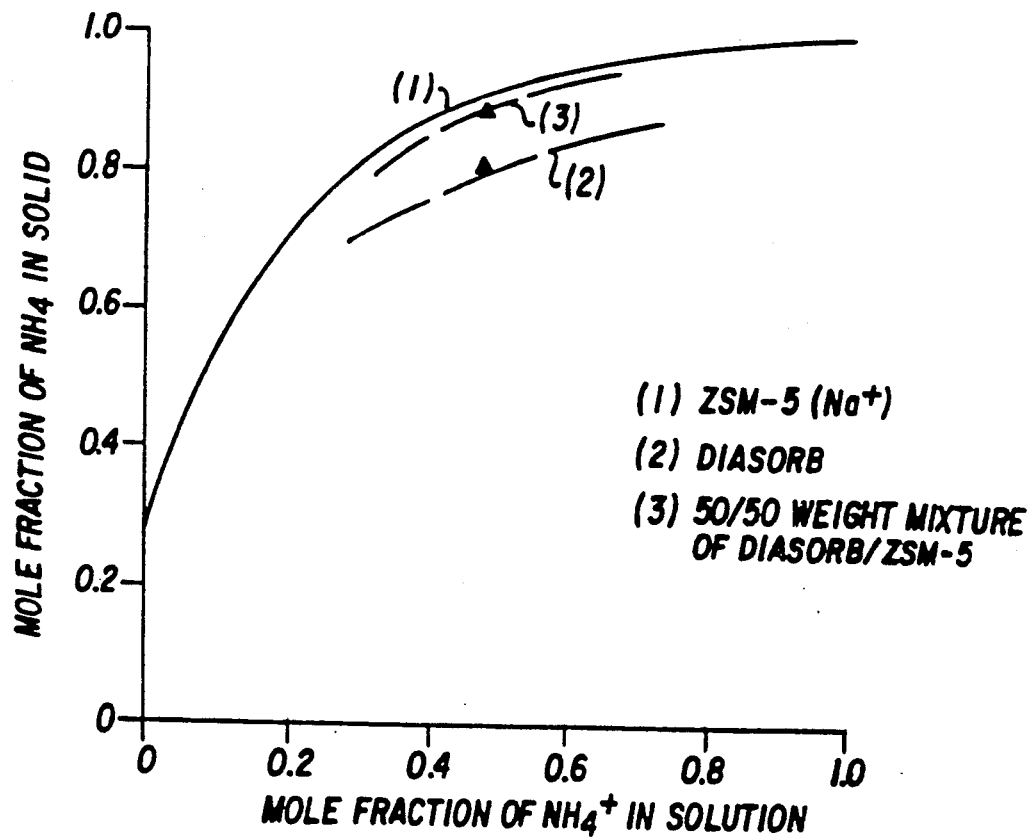
FIG. 2 $NH_4^+$-$Na^+$ EXCHANGE ISOTHERMS AT 25°C

ZEOLITE-CLAY COMPOSITION AND USES THEREOF

CROSS-REFERENCE TO RELATED APPLICATIONS

This application is a division of U.S. Pat. application Ser. No. 07/409,372, filed Sep. 19, 1989 now U.S. Pat. No. 5,079,201.

FIELD OF THE INVENTION

This invention is concerned with a hydrous aluminosilicate composition. In particular, it is concerned with a composition comprising, as active ingredients, a non-fibrous clay together with a non-fibrous zeolite. The invention is further concerned with an improvement in animal husbandry wherein the diet of said animal is supplemented by the composition of this invention.

BACKGROUND OF THE INVENTION

Natural clays have been used for treatment of gastrointestinal disorders since at least before 300 B.C. The following is an excerpt from the Hoover translation of Re De Metallica, Dover Publications, New York, N.Y., Book II, p. 31 (1950).

"... a hill in the island of Lemnos ... in the northern Aegean Sea has produced this earth'. ... reddish-yellow clay ... from before Theophrastus' time (372-287 B. C.) down to the present day. According to Dana (System of Mineralogy 689), it is cimolite, a hydrous silicate of aluminum. The Ancients distinguished two kinds—one sort used as pigment, and the other for medicinal purposes. This latter was dug with great ceremony at a certain time of the year, molded into cubes, and stamped with a goat—the symbol of Diana. It thus became known as terra sigillata, and was an article of apothecary commerce down to the last century. It is described by Galen (xii., 12), Dioscorides (v., 63), and Pliny (xxxv., 14), as a remedy for ulcers and snake bites."

The time-honored history of the medicinal use of natural clays continues today. Kaolin, for example, is described in the Merck Index, Tenth Edition, (Monograph 5119, p. 759) as a "white or yellowish-white earthy mass or white powder"; and that it is "prepared for pharmaceutical or medicinal purposes by levigating with water to remove sand, etc". Its Therapeutic Category is given as "Adsorbent", and its Veterinary Therapeutic Category as "Topical and G. I. (gastrointestinal) adsorbent. Poultice". Also, remedies for diarrhea that use clay may be purchased over the counter in most pharmacies. In a local pharmacy in New Jersey, for example, one of us found three different brands of tablets under the names of Kaopectate (Upjohn), Rheaban (Leeming Div., Pfizer), and Diar-Aid (Thompson Medical Co.). The labels on all of these showed the active ingredient to be Attapulgite, each-tablet containing 600 (or 750 mg) of this component along with inert materials or adjuvants such as zinc or magnesium stearate, colloidal $SiO_2$, $TiO_2$, starch, etc.

The zeolite minerals, another type of hydrous aluminosilicates which like clays have been known since ancient times, received little attention from mineralogists and others until about 30 years ago, most probably due to the relative scarcity of these minerals. This neglect changed radically with the first successful commercialization by Union Carbide Corporation of a synthetic crystalline zeolite known as "Linde-5A". Since that time a number of synthetic zeolites, some having no known mineral counterparts, have been prepared and successfully exploited as industrial adsorbents and catalysts. This in turn led to awakened interest in natural deposits of mordenite and erionite, for example, which are now known to be extensive. For a description of the structure, chemistry and use of natural and synthetic crystalline zeolites, see "Zeolite Molecular Sieves", Donald W. Breck, published by John Wiley and Sons, New York, N.Y. (1974), incorporated herein by reference for background.

Attention was first brought to adding zeolites to animal feed in the 1960's by the Japanese who used it on chickens and pigs to alleviate fecal odor. It was found that such practice also showed benefits in weight gain and general health (i.e. in improved performance) of the animals. A growing amount of research on zeolites as dietary supplements for animals has since taken place, as indicated, for example, by the twenty-nine papers presented at the 1982 meeting in Pottsdam, N.Y. by researchers from the USA, Japan, China, Czechoslovakia, Bulgaria, USSR, and Italy. See "Zeo-agriculture, Use of Natural Zeolites in Agriculture and Aquaculture", edited by W. G. Pond and F. A. Mumpton, Westview Press, Boulder, Colo., 1984, incorporated herein by reference for background purposes. Studies were reported on pigs, chickens, cattle, and fish. Although the editors comment that many of the results lack agreement, the following noteworthy points are made in the foregoing publication: evidence is available and generally agreed upon for improved performance of swine, ruminants, and poultry fed zeolite-supplemented rations; a possible physiological explanation for the improved performance is the known binding action for $NH_4+$ of zeolites and reduction of portal blood ammonia from the gastrointestinal tract; if dietary antibiotics promote growth by suppressing ammonia formation in the gastrointestinal tract, this could at least in part explain the similar growth response induced by dietary zeolites.

BRIEF SUMMARY OF THE INVENTION

This invention, in its broadest aspect, provides an improved non-fibrous hydrous aluminosilicate composition that contains both a high-silica content crystalline zeolite and a clay adsorbent, as more fully described below. We have found that when the total sorption capacity and the ammonium ion selectivity are measured separately for the clay and the zeolite components, the clay sorbent exhibits a higher total capacity than the zeolite for ammonium cations, while the crystalline zeolite component exhibits a significantly higher selectivity for the ammonium cation. Thus, at low concentrations of available ammonia, the zeolite can be expected to more efficiently bind this cation than will the clay, while at high concentrations the higher capacity of the clay will supplement this lesser capacity of the zeolite. When evaluated as a 50:50 mixture of the two components, as shown in FIG. 2, it was surprising to find that the selectivity of the mixture for ammonium cation was equivalent to that of the zeolite alone, i.e., a synergism results from the presence of both components.

The hydrous silicate composition provided by this invention has other advantages. Since clays, by definition, are naturally occurring minerals, and since they are adsorbents, the composition of the clay is likely to be variable and it may contain metals or other impurities that are physiologically toxic or otherwise undesirable. In contrast, it is known that the synthetic zeolites can be made in very large quantity, with very little or no variability in composition and properties. Thus, the presence of the zeolite in the hydrous aluminosilicate composition of this invention serves to diminish the potentially adverse effects of contaminants which may not readily be removed from the natural clay.

It is contemplated that the compositions of this invention are broadly useful as dietary supplements in animal husbandry to improve performance of the animals. In this connection, the particular zeolites used herein are highly resistant to change in properties when exposed to an acidic environment. This is an advantage with animals such as dogs, for example, which have gastric secretions known to be highly acidic.

BRIEF DESCRIPTION OF THE DRAWING

FIG. 1. X-ray Analysis Of Diasorb.
FIG. 2. Ion-Exchange Isotherms.

PREFERRED EMBODIMENTS AND BEST MODE

It is contemplated that any clay that is non-fibrous and is capable of sorbing ammonia is useful for the composition of this invention. The term "clay" as used herein refers to naturally occurring clay minerals of the aluminosilicate variety which are characterized by very small crystals that readily adsorb water. Non-fibrous varieties of smectite, kaolinite, vermiculite and sepiolite are contemplated as useful in the present invention. Examples of preferred clays include non-fibrous kaolin, non-fibrous smectites, and non-fibrous attapulgite. Non-fibrous attapulgite is particularly preferred. The preparation of such clay, such as washing to separate sand, etc. for pharmacological use, is well known to those skilled in the art, and need not be described in detail since such preparation per se is not considered part of the present invention.

The zeolites useful herein have a silica to alumina ratio of at least 10, and an effective pore size of generally from about 5 to about 8 angstroms, such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolites ineffective.

A convenient measure of the extent to which a zeolite provides controlled access to molecules of varying sizes to its internal structure is the Constraint Index CI) of the zeolite.'Zeolites which provide a highly restricted access to and egress from its internal structure, as evidenced by the relative rates of cracking for normal hexane and 3-methyl pentane, have a high value for the Constraint Index, and zeolites of this kind usually have pores of small size, e.g. less than 5 angstroms. On the other hand, zeolites which provide relatively free access to the internal zeolite structure have a low value for the Constraint Index, and usually have pores of large size, e.g. greater than 8 angstroms. The method by which Constraint Index is determined is described fully in U.S. Pat. No. 4,016,218, incorporated herein by reference for details of the method.

Constraint Index (CI) values for some typical materials (some of which are outside the scope of the present invention are:

|  | CI (at test temperature) |
|---|---|
| ZSM-4 | 0.5 (316° C.) |
| ZSM-5 | 6–8.3 (371° C.–316° C.) |
| ZSM-11 | 5–8.7 (371° C.–316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-38 | 2 (510° C.) |
| ZSM-48 | 3.5 (538° C.) |
| ZSM-50 | 2.1 (427° C.) |
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica-alumina | 0.6 (538° C.) |
| Dealuminized Y | 0.5 (510° C.) |
| Erionite | 38 (316° C.) |
| Zeolite Beta | 0.6–2.0 (316° C.–399° C.) |

The above-described Constraint Index is an important definition of those zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operations (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g. temperature, as to establish more than one value for the Constraint Index of a particular zeolite. This explains the range of Constraint Indices for some zeolites, such as ZSM-5, ZSM-11 and Beta.

It is to be realized that the above CI values typically characterize the specified zeolites, but that such values are the cumulative result of several variables useful in the determination and calculation thereof. Thus, for a given zeolite exhibiting a CI value within the range of 1 to 12, depending on the temperature employed during the test method within the range of 290° C. to about 538° C., with accompanying conversion between 10% and 60%, the CI may vary within the indicated range of 1 to 12. Likewise, other variables such as the crystal size of the zeolite, or the presence of possibly occluded contaminants and binders intimately combined with the zeolite, may affect the CI. It will accordingly be understood to those skilled in the art that the CI, as utilized herein, while affording a highly useful means for characterizing the zeolites of interest, is approximate, taking into consideration the manner of its determination, with the possibility, in some instances, of compounding variable extremes. However, in all instances, at a temperature within the above-specified range of 290° C. to about 538° C., the CI will have a value for any given zeolite of interest herein within the approximate range of 1 to 12.

The class of highly siliceous zeolites defined herein is exemplified by ZSM-5, ZSM-11, ZSM-12, ZSM-23, ZSM-35, ZSM-38, ZSM 48, and other similar materials.

U.S. Pat. No. 3,702,886 describing and claiming ZSM-5 is incorporated herein by reference.

ZSM-11 is more particularly described in U.S. Pat. No. 3,709,979, the entire content of which is incorporated herein by reference.

ZSM-12 is more particularly described in U.S. Pat. No. 3,832,449, the entire content of which is incorporated herein by reference.

ZSM-23 is more particularly described in U.S. Pat. No. 4,076,842, the entire content of which is incorporated herein by reference.

ZSM-35 is more particularly described in U.S. Pat. No. 4,016,245, the entire content of which is incorporated herein by reference.

ZSM-38 is more particularly described in U.S. Pat. No. 4,046,859, the entire content of which is incorporated herein by reference.

The specific zeolites described, when prepared in the presence of organic cations, are substantially catalytically inactive, possibly because the intra-crystalline free space is occupied by organic species from the forming solution. These organic templates are removed by heating in an inert atmosphere at 1000° F. for one hour, for example, followed by base exchange with ammonium salts followed by calcination at 1000° F. in air, prior to evaluation of the Constraint Index. The same calcination procedure also serves to remove the organic template prior to use of the zeolite in compositions of this invention. However, instead of allowing the zeolite to remain in the hydrogen (calcined ammonium form, it is preferred to convert it by base exchange procedures, known to those skilled in the art, to the sodium form or to any other non-toxic and desirable salt form. This ion exchange may be conducted on the zeolite before or after compositing with the clay.

The sorbent composition of this invention comprises as active ingredient about 5 to 95 parts by weight of clay per 100 total parts of clay plus zeolite, and preferably 25 to 75 parts of clay per said 100 total parts.

For use as a feed supplement for animals, the two components, i.e., zeolite and clay, may be mixed in the desired proportions and the mixture of powders added to animal feed. Alternatively, the mixture of powders may be pelleted, using adjuvants such as starch, for ease of handling. Or the clay and zeolite may be pelleted separately and the pellets administered in the desired proportion.

The term "animal" as used herein is intended to include mammals such as swine, dogs, sheep, and cows, and to include fowl such as chicken and duck, and fish, but to exclude human beings. See definitions, especially definition (2), Webster's New World Dictionary, second college edition, 1984, Prentice Hall Press.

It is contemplated that the composition of this invention is useful also as powder, ointment, salve, or poultice for veterinary topical application in order to alleviate or cure skin disorders, particularly in mammals. For such purpose any carrier, such as lanolin or petroleum jelly, may be blended with the clay and zeolite powders in the desired proportions. The carrier may be the major component of the mixture, as applied.

EXAMPLES

The following examples are intended to illustrate the present invention without limiting the scope thereof, which scope is defined by this entire specification including appended claims. All amounts, proportions and selectivities shown are on a weight basis unless explicitly stated to be otherwise.

Example 1 (Prior Art)

An over-the-counter diarrhea pill "Diasorb", marketed by Key Pharmaceuticals, Inc., Miami, Fla. 33137, Lot No. 693231, Exp. 5/88, was analyzed and found to have the following compositions:

| ELEMENTAL COMPOSITION OF "DIASORB" | |
|---|---|
| | Wt % |
| Ash | 85.1 |
| $SiO_2$ | 57.4 |
| $Al_2O_3$ | 17.2 |
| Mg | 2.4 |
| Ca | 1.4 |
| K | 0.14 |
| Na | 0.18 |
| Fe | 1.6 |
| Ti | 0.25 |
| C* | 3.4 |
| $SiO_2/Al_2O_3$ Ratio | 5.7 |

*Apparently starch, present as binder for clay particles.

The X-ray diffraction pattern is that of a clay (FIG. 1). The material in the pill was examined by S. E. M. (scanning electron microscopy) and found to be non-fibrous. The $NH_4^+/Na^+$ exchange isotherm of the material was determined at 25° C. The results are included in FIG. 2. Total ammonia adsorption is 80% $NH_4^+$ in an equimolar $NH_4^+/Na^+$ exchange media.

Example 2 (Prior Art)

A ZSM-5 zeolite preparation had the following composition:

| | Wt % | |
|---|---|---|
| Ash | | 92.0 |
| $SiO_2$ | | 91.0 |
| $Al_2O_3$ | | 2.2 |
| Mg | | .02 |
| Ca | less than | .03 |
| K | less than | .10 |
| Na | | .02 |
| Fe | | .06 |
| Ti | | .02 |
| C | less than | .10 |
| $SiO_2/Al_2O_3$ Ratio | | 70.0 |

It was examined by S. E. M. which showed that, like the clay, it also was non-fibrous. The zeolite consisted mostly of 2-micron particles compared to some the same size but mixed with many larger particles in the clay. The $NH_4^+/Na^+$ exchange isotherm included in FIG. 2 shows it to be more selective for $NH_4^+$ compared to the clay. Total ammonia adsorption was 91% $NH_4^+$ in an equimolar $NH_4^+/Na^+$ exchange media.

Example 3

This example illustrates the preparation of a 50/50 wt% mixture of the clay of Example 1 with NaZSM-5, and the unexpectedly high selectivity of the mixture for ammonium ions. The experiment was carried out as follows:

1.5 g "Diasorb" (coating peeled off capsule) was mixed with 1.5 g NaZSM-5. To this mixture was added 60 ml of 50/50 (0.1N $NH_4NO_3$/0.1N NaCl) solution and allowed to stand at room temperature for 4 hours. The liquid was then removed and replaced with a fresh 60 ml portion of solution, and the exchange procedure repeated to provide a total of three exchanges.

Analysis showed a selectivity for $NH_4^+$ of 89% with the mixture, compared to 81% for the clay alone and 91% for the ZSM-5 alone. The $NH_4^+$-$Na^+$ exchange isotherm for the mixture is included in FIG. 2 of the drawing, and shows a synergistic, high selectivity for the $NH_4^+$ cation. Capacity of the mixture for $NH_4^+$ was 0.79 meq/g, intermediate between 0.45 meq/g for ZSM-5 alone and 1.15 meq/g for clay alone.

What is claimed is:

1. In a method for supplementing the diet of animals, the improvement which comprises:
adding an effective amount of a hydrous aluminosilicate sorbent composition to animal feed, wherein said hydrous aluminosilicate sorbent composition comprises a non-fibrous, naturally-occurring clay and a non-fibrous, crystalline zeolite having a silica to alumina ratio of at least 10 and a Constraint Index of 1 to 12, and wherein said clay constitutes 5 to 95 parts by weight per 100 total parts of clay plus zeolite.

2. The method of claim 1 wherein said clay constitutes 25 to 75 parts by weight per 100 total parts of clay plus zeolite.

3. The method of claim 1 wherein said non-fibrous, crystalline zeolite has the crystal structure of ZSM-5, ZSM-11, ZSM-12, ZSM-23, ZSM-35, ZSM-38, mordenite or clinoptilolite.

4. The method of claim 1 wherein said non-fibrous, crystalline zeolite has the crystal structure of ZSM-5.

5. The method of claim 1 wherein said non-fibrous, naturally-occurring clay is a non-fibrous kaolin, a non-fibrous smectite or a non-fibrous attapulgite.

6. The method of claim 1 wherein said animals are mammals.

7. The method of claim 1 wherein said animals are fish or fowl.

8. The method of claim 1 wherein said non-fibrous, naturally-occurring clay and said non-fibrous, crystalline zeolite are mixed and added to said animal feed as a mixture of powders.

9. The method of claim 8 wherein said mixture of powders is pelleted before adding to said animal feed.

10. The method of claim 9 wherein said mixture of powders is pelleted using starch.

11. The method of claim 1 wherein said non-fibrous, naturally-occurring clay and said non-fibrous, crystalline zeolite are pelleted separately and the pellets are added to said animal feed.

12. The method of claim 11 wherein said non-fibrous, naturally-occurring clay and said non-fibrous, crystalline zeolite are pelleted using starch.

13. In a method of topically applying absorbent clay to animals to alleviate or cure a skin disorder, the improvement which comprises:
substituting for said clay a hydrous aluminosilicate sorbent composition, wherein said hydrous aluminosilicate sorbent composition comprises a non-fibrous, naturally-occurring clay and a non-fibrous, crystalline zeolite having a silica to alumina ratio of at least 10 and a Constrain Index of 1 to 12, and wherein said clay constitutes 5 to 95 parts by weight per 100 total parts of clay plus zeolite.

14. The method of claim 13 wherein said non-fibrous, naturally-occurring clay constitutes 25 to 75 parts by weight per 100 total parts of clay plus zeolite.

15. The method of claim 13 wherein said non-fibrous, crystalline zeolite has the crystal structure of ZSM-5, ZSM-11, ZSM-12, ZSM-23, ZSM-35, ZSM-38, mordenite or clinoptilolite.

16. The method of claim 13 wherein said non-fibrous, crystalline zeolite has the crystal structure of ZSM-5.

17. The method of claim 13 wherein said animals are mammals.

18. The method of claim 13 wherein a carrier material is blended with said non-fibrous, naturally-occurring clay and said non-fibrous crystalline zeolite.

19. The method of claim 18 wherein said carrier material is lanolin or petroleum jelly.

20. The method of claim 13 wherein said hydrous aluminosilicate sorbent composition is topically applied in the form of a powder, ointment, salve or poultice.

* * * * *